Patented Jan. 5, 1954

2,665,214

UNITED STATES PATENT OFFICE 2,665,214

CORN PUFFS

Ernest Scott, Weslaco, Tex.

No Drawing. Application July 29, 1949,
Serial No. 107,643

5 Claims. (Cl. 99—81)

This invention relates to new and useful improvements in food products and to methods for producing the same.

One object of the invention is to provide a food product having ground corn as a principal ingredient, said food product having a novel puffed shape or form.

Yet another object of the invention is to provide an improved food product having ground corn as a principal ingredient, to which is imparted an original and appetizing taste and appearance, while being easily digestible and of nutritive food value.

A still further object of the invention is to provide an improved method of producing a food product with ground corn as its principal ingredient wherein flour is incorporated into the surface of a thin layer of corn mixture to provide sealing of the surface under cooking conditions whereby the food product is caused to puff or enlarge in a novel fashion.

Other and more detailed objects of the invention will appear upon a reading of the following description, a particular example of the process and of the food product being set forth therein.

The principal ingredient of my novel food product is ground corn or corn paste known among the Mexican people as "Masa." The following procedure may be followed to produce such corn paste or "Masa," it being understood that I make no claim as to the novelty of this particular product.

Various quantities of corn may be treated at one time, but for the sake of convenience, I have based the procedure upon the treatment of fifty (50) pounds of corn. Beginning with fifty (50) pounds of white shell corn in the dry state, and one (1) pint of air-floated, Austin white, hydrated chemical lime, the corn is placed in a galvanized tub or a similar vat, the lime is added, and enough cool water to cover the corn and lime. Depending upon temperature conditions, the amount of lime may be varied, and hot water may be used to cut down the soaking time. The mixture is stirred well and allowed to soak from 18 to 20 hours or until the husks slip from the kernels of corn. The lime and water mixture is then drained off and the kernels of corn are placed in a suitable porous container wherein they are subjected to a flowing stream of fresh water. The corn kernels are rinsed thoroughly and scrubbed with a stiff brush or by machinery, suitable for this purpose, to remove the husks. The corn is now ready for grinding, and after grinding is in the moist dough form known as corn paste or as "Masa." This "Masa" forms the principal ingredient of my new food product. It is to be noted that no water is added during the grinding process.

I will now describe the procedure for making my food product.

To each pound of the "Masa," one-third of an ounce of salt by measure is added and the mixture is well stirred, mixed and kneaded to form a homogeneous mass. This mixture or corn dough is then formed into a relatively thin sheet, preferably by passage between two rollers approximately seven thirty-seconds of an inch apart. Immediately after forming the dough into the thin sheet, white wheat flour, or any good grade of edible cereal flour, is sprayed, dusted or blown in a dry condition onto each surface of the sheet of dough. Following this step, the flour-coated dough is further compressed or compacted by suitable rolling or patting to thin the sheet of dough, preferably to approximately five thirty-seconds of an inch, and preferably by means of a pair of opposed rollers through which the sheet of dough passes, and then is again sprayed with flour. I have found it desirable to use also a third set of rolls or rollers which further press the dough mixture to a thickness of approximately three thirty-seconds inch. The dough is then ready for cutting into pieces of suitable size and shape for cooking. I prefer to pass the sheet of dough through a set of circular knife rolls which cut the dough into three-quarter inch strips and subsequently to cut the strips into three-quarter inch lengths whereby I am provided with a number of squares of the dough three-quarter inch by three-quarter inch by approximately three thirty-seconds of an inch in thickness. It is obvious that the dough may also be formed into circles or other arcuate shapes, into hexagons or other polygonal shapes, into oblongs, rectangles and the like. I have no intention of limiting the shape or dimensions of the pieces or particles of the dough. Further, although I have set forth the most desirable thicknesses of the sheet of dough in the various steps, I do not wish to be limited to such precise measurements since considerable latitude is obviously permissible. It is only necessary that the sheet of dough be rolled reasonably thin to permit its quick cooking in the subsequent steps.

In the cooking of the food product, the small squares produced as recited hereinabove, are dropped into a hot liquid or a hot cooking oil of any suitable type. I preferably use an oil of vegetable origin but it is obvious that any of the many types of cooking oil readily available may be employed. The first cooking vat or body of oil is desirably maintained at a temperature of approximately 450° F., and the small squares of dough are preferably left in the initial cooking vat approximately eight (8) seconds more or less, or until they puff up into the form of small pillows or blisters. Following the puffing of the particles of dough, they are removed and placed in a second vat of hot cooking oil, preferably maintained at a temperature of about 350° F., and there left for approximately four minutes and fifty-two seconds more or less, making a total cooking time of approximately five (5) minutes. It is obvious that variation in the temperature of the cooking vat will necessitate an according change in the time of cooking, and further that the times of cooking in both or either of the vats may be varied to achieve greater or lesser puffing of the product and a greater or lesser degree of doneness and browning of the final food product.

Following the cooking step, the food products are removed and drained, preferably by placing on a clean cotton cloth which will absorb the surplus cooking oil or by passing through a heated oven. After a few moments drying and draining, the food products are ready for packing.

It is manifest that all of these operations may be carried out by hand by the following of normal kitchen or cooking procedures. I have found, however, that it is desirable to employ machinery as much as possible for the production of this novel food, and will describe briefly the nature of such machinery.

Of course, the corn which has been treated with lime may be ground in any suitable type of commercial grinder, or, indeed, the corn paste or "Masa" may be obtained from outside or commercial sources. The production of this corn paste is not a part of my invention and the procedure for its production is given solely for the sake of a complete disclosure.

The corn paste or "Masa" may be mixed with the salt in any of the many commercially available mixing machines or dough-forming or working machines to produce the dough which is rolled into my food product. I prefer to feed the dough from a suitable hopper between a pair of power-driven rollers which cuts the "Masa" to a thickness of approximately seven thirty-seconds of an inch and to spray or dust the flour onto both surfaces of the sheets so produced under air pressure in a continuous fashion as the sheet of dough passes through the first pair of rollers. Without interruption, the sheet of dough is then passed through the second pair of rollers which further reduces the thickness of the sheet of dough and is again dusted with flour, and thence through the third set of rollers which further thins the sheet to a thickness of about three thirty-seconds inch. Without interruption the sheet then passes between the cutting rollers which cut the sheet of dough into elongate strips and divide the strips up into small lengths of a size suitable for cooking and eating. This is a continuous process, the dough passing in a substantially continuous and single length through the various rollers, and indeed the final pieces or small squares of the dough which are produced may drop directly into the initial cooking vat.

It is important that the dough be reduced to a thickness of about three thirty-seconds of an inch. If the dough is very much thicker it does not puff up in the proper fashion when dropped into the hot cooking oil, and if the dough is very much thinner the final product is too fragile and is easily shattered in the course of normal packing and shipping. It is also important that the initial vat of cooking oil be near a temperature of 450° F., since the action of the cooking vat is to seal quickly the outer surface of the small squares of dough by cooking substantially instantaneously the thin coat of flour which has been pressed into both sides of each of the squares. Following this sealing action, it is my theory that the creation of internal temperatures within the small squares causes the evolution of steam or vapor which exert an internal pressure and cause the squares of dough to puff in the manner described.

Of course, the coating of each side of the sheet of dough with the thin dusting of wheat or other flour is important in effecting a sealing of the surfaces of the pieces of dough in order to obtain the puffing action.

I have found it is desirable to spray the hot cooking oil over the small squares of dough in either or both vats as they are cooking. Normally, the squares tend to float in the vats of hot cooking oil, and the spraying of hot oil thereover tends to result in a more uniform cooking. Obviously, a number of devices may be used to carry out this function. I prefer to pump the hot cooking oil directly from the vats to sets of spray nozzles spaced closely above the oil level in the vats and there deliver the hot oil directly onto the upper sides of the squares of dough. It is to be noted, however, that this oil spraying step is not an essential step in my process, and may be employed in either, both, or neither of the cooking steps.

What I claim and desire to secure by Letters Patent is:

1. A process for producing a food product including, rolling corn dough into a sheet, then dusting flour on each side of the sheet, then rolling the flour into the sheet, cutting the sheet into relatively small pieces, and cooking said pieces for a short interval of time in a hot body of cooking oil having a temperature of approximately 450° F. to puff the said small pieces, and for a longer interval of time in a second body of cooking oil at a temperature of approximately 350° F. to complete the cooking.

2. A process for producing a food product including, rolling corn dough into a sheet, then dusting flour on each side of the sheet, then rolling the flour into the sheet, cutting the sheet into relatively small pieces, puffing said pieces of corn dough in a body of hot oil at a temperature of approximately 450° F. for a short interval of time, and cooking the puffed pieces of dough in a body of hot cooking oil at a temperature substantially below 450° F.

3. The process for producing a food product including, forcing uncooked corn dough into a thin sheet-like form, forcing edible cereal flour into both surfaces of the sheet-like form, dividing the sheet-like form into a plurality of small pieces, puffing said pieces into the form of small completely-hollow thin-walled pieces by cooking said pieces a short time in a body of hot cooking oil at approximately 450° F., and then cooking the puffed pieces a longer period of time in a body of hot cooking oil at a temperature of approximately 350° F. so as to complete the cooking of the puffed pieces.

4. A process as set forth in claim 3, and spraying hot cooking oil over the pieces simultaneously with their cooking in one of said bodies of cooking oil.

5. A process as set forth in claim 3, and spraying hot cooking oil over the pieces simultaneously with their cooking in both of said bodies of cooking oil.

ERNEST SCOTT.

References Cited in the file of this patent

UNITED STATES PATENTS

| Number | Name | Date |
|---|---|---|
| 1,926,347 | Morrow | Sept. 12, 1933 |
| 2,002,053 | Doolin | May 21, 1935 |
| 2,162,376 | Collatz | June 13, 1939 |
| 2,168,246 | Shepherd | Aug. 1, 1939 |
| 2,388,904 | Collatz | Nov. 13, 1945 |

OTHER REFERENCES

Lord, Everybody's Cook Book, 1924, Henry Holt & Co., N. Y., page 156.

Gillette, White House Cook Book, Saalfield Pub. Co., Akron, Ohio, 1929, page 354.